(12) United States Patent
Sievers-Paulsen et al.

(10) Patent No.: US 10,494,980 B2
(45) Date of Patent: Dec. 3, 2019

(54) DEVICE FOR ACCOMMODATING A MUFFLER FOR A TWO-WHEEL VEHICLE

(71) Applicant: Bayerische Motoren Werke Aktiengesellschaft, Munich (DE)

(72) Inventors: Johann Sievers-Paulsen, Freising (DE); Stefan Selinger, Munich (DE); Matthias Dressler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 279 days.

(21) Appl. No.: 15/145,971

(22) Filed: May 4, 2016

(65) Prior Publication Data

US 2016/0245148 A1    Aug. 25, 2016

Related U.S. Application Data

(63) Continuation of application No. PCT/EP2014/073915, filed on Nov. 6, 2014.

(30) Foreign Application Priority Data

Nov. 29, 2013   (DE) ........................ 10 2013 224 562

(51) Int. Cl.
*F01N 1/00* (2006.01)
*F01N 13/18* (2010.01)
*B60K 13/04* (2006.01)
*B62J 11/00* (2006.01)
*B62K 11/02* (2006.01)

(52) U.S. Cl.
CPC .......... *F01N 13/1822* (2013.01); *B60K 13/04* (2013.01); *B62J 11/005* (2013.01); *B62K 11/02* (2013.01)

(58) Field of Classification Search
CPC ........ F01N 13/08; F01N 1/02; F01N 13/1822; F01N 13/16; F01N 1/00; F01N 13/1855; B60K 13/04; B60K 11/02
See application file for complete search history.

(56) References Cited

U.S. PATENT DOCUMENTS 5,433,286 A * 7/1995 Kumamaru ............ B62K 11/10
                                                  180/219
5,969,299 A * 10/1999 Yamaguchi ............. F01N 1/089
                                                  181/227

(Continued)

FOREIGN PATENT DOCUMENTS

CN         1522926 A    8/2004
CN       102139734 A    8/2011

(Continued)

OTHER PUBLICATIONS

International Search Report (PCT/ISA/210) issued in PCT Application No. PCT/EP2014/073915 dated Jan. 23, 2015, with English translation (four (4) pages).

(Continued)

*Primary Examiner* — Hau V Phan

(74) *Attorney, Agent, or Firm* — Crowell & Moring LLP

(57) ABSTRACT

A device for accommodating a muffler for a two-wheel vehicle, in particular a motorcycle, includes a holder part that can be fastened to a structural component of the two-wheel vehicle. The holder part retains the muffler. A plastic part is used as the holder part.

19 Claims, 2 Drawing Sheets

(56) References Cited

U.S. PATENT DOCUMENTS

| | | | |
|---|---|---|---|
| 6,349,785 B1* | 2/2002 | Ohmika | B62K 11/10 180/219 |
| 7,156,199 B2 | 1/2007 | Takano | |
| 7,325,651 B2* | 2/2008 | Kikuchi | F01N 1/089 180/296 |
| 7,510,050 B2* | 3/2009 | Emler | F01N 1/003 181/227 |
| 7,568,548 B2* | 8/2009 | Fujii | B62J 17/02 180/309 |
| 7,699,134 B2* | 4/2010 | Terashima | F01N 1/084 180/309 |
| 7,766,123 B2* | 8/2010 | Sakurai | F01N 1/085 181/267 |
| 7,779,963 B2* | 8/2010 | Muto | F01N 1/003 180/296 |
| 7,997,383 B2* | 8/2011 | Sakurai | F01N 1/003 181/227 |
| 8,002,081 B2* | 8/2011 | Honma | F01N 1/006 181/252 |
| 8,074,756 B2* | 12/2011 | Kusaka | B62K 5/01 180/225 |
| 8,091,683 B2* | 1/2012 | Tabata | F01N 1/00 181/227 |
| 8,479,862 B2* | 7/2013 | Mori | F01N 13/08 180/219 |
| 8,997,921 B2* | 4/2015 | Uzawa | F01N 13/082 181/227 |
| 2001/0045314 A1* | 11/2001 | Maki | B60K 13/04 180/309 |
| 2002/0007977 A1* | 1/2002 | Ishii | B62J 17/00 180/219 |
| 2002/0096385 A1* | 7/2002 | Kuji | F01N 1/02 180/309 |
| 2004/0178012 A1 | 9/2004 | Takano | |
| 2005/0161283 A1* | 7/2005 | Emler | F01N 1/003 181/249 |
| 2006/0261146 A1* | 11/2006 | Harada | B60R 13/10 235/375 |
| 2007/0075521 A1* | 4/2007 | Ogasawara | B62J 25/00 280/291 |
| 2008/0156562 A1* | 7/2008 | Yano | B62J 1/12 180/219 |
| 2009/0224448 A1* | 9/2009 | Rodecker | F16F 1/3849 267/141.1 |
| 2011/0186373 A1 | 8/2011 | Mori et al. | |
| 2012/0325578 A1 | 12/2012 | Giaume | |
| 2013/0075192 A1* | 3/2013 | Hayama | F01N 3/2885 181/228 |

FOREIGN PATENT DOCUMENTS

| | | |
|---|---|---|
| CN | 102582727 A | 7/2012 |
| EP | 0 448 728 A1 | 10/1991 |
| EP | 0 448 728 B1 | 7/1994 |
| EP | 2 105 586 A1 | 9/2009 |
| EP | 2 400 093 A1 | 12/2011 |
| JP | 10-95379 A | 4/1998 |
| JP | 11-280460 A | 10/1999 |
| JP | 2004-124455 A | 4/2004 |

OTHER PUBLICATIONS

German Office Action issued in counterpart German Application No. 10 2013 224 562.9 dated Jul. 4, 2014 (seven (7) pages).

German Office Action issued in counterpart German Application No. 10 2013 224 562.9 dated Oct. 19, 2015 (six (6) pages).

Chinese-language Office Action issued in counterpart Chinese Application No. 201480053897.2 dated Jul. 27, 2017 with English translation (Eleven (11) pages).

Chinese-language Office Action issued in counterpart Chinese Application No. 201480053897.2 dated Mar. 16, 2018 with English translation (five (5) pages).

Hindi-language Office Action issued in counterpart Indian Application No. 201747028459 dated Aug. 27, 2019 with English translation (five (5) pages).

* cited by examiner

DEVICE FOR ACCOMMODATING A MUFFLER FOR A TWO-WHEEL VEHICLE

CROSS REFERENCE TO RELATED APPLICATIONS

This application is a continuation of PCT International Application No. PCT/EP2014/073915, filed Nov. 6, 2014, which claims priority under 35 U.S.C. § 119 from German Patent Application No. 10 2013 224 562.9, filed Nov. 29, 2013, the entire disclosures of which are herein expressly incorporated by reference.

BACKGROUND AND SUMMARY OF THE INVENTION

The invention relates to a device for holding a muffler of a two-wheeled vehicle, in particular a motorcycle.

The muffler of the exhaust system of a motorcycle is usually fastened to its frame construction, more precisely to a frame part at the rear of the motorcycle.

It is an object of the invention to provide an alternative holding device for the muffler of a two-wheeled vehicle, which holding device is less expensive and more flexible overall.

This and other objects are achieved by way of a device for holding a muffler of a two-wheeled vehicle, in particular a motorcycle, having a holder part which can be fastened to a structural component of the two-wheeled vehicle and by way of which the muffler is held, wherein the holder part is a plastic part. Advantageous and expedient refinements of the device according to the invention are described and claimed herein.

The device according to the invention serves to hold a muffler of a two-wheeled vehicle, in particular a motorcycle, and includes a holder part which can be fastened to a structural component of the two-wheeled vehicle. The muffler is held in the holder part. According to the invention, the holder part is a plastic part.

The invention is based on the finding that a (metallic) frame part is not absolutely necessary for holding the muffler. It has been proven surprisingly that it is possible to produce a holder for the muffler which is suitable for a two-wheeled vehicle by way of a suitable plastic which has sufficient stability and possibly heat resistance, and to integrate it into the vehicle body in such a way that the typical requirements made of a holder of this type can be met. In the context of the invention, a plastic part is also to be understood to mean parts made from fiber-reinforced plastic.

The invention has the advantage that a frame part can be saved as a result of the muffler being held in a plastic part. In addition, a plastic part can be manufactured rapidly and inexpensively in virtually any desired shape in large numbers by use of established processes (injection molding, etc.).

The holder part made from plastic can preferably be fastened to a frame construction of the two-wheeled vehicle. Stable and relatively secure holding of the holder part can be ensured as a result.

According to one development of the invention, the holder part is therefore designed as a functional component which performs functions which go beyond holding of the muffler. This means that, in addition to the load-bearing function, the plastic part can assume further tasks as a structural component, with the result that the number of components overall can be reduced. This results in further advantages in respect of weight, tolerances, costs, assembly complexity and logistics.

A plastic part which otherwise serves as a helmet compartment of the motorcycle can thus be used as holder part. Since the helmet compartment of a motorcycle is held stably on the frame and is usually arranged precisely above the muffler, a combination of the two components may be suitable for the purpose according to the invention.

Moreover, the holder part according to the invention can have, for example, integrated air guides. The holder part can thus be optimized aerodynamically. "Integrated" is to be understood here and in the following text in such a way that the holder part is shaped such that it in principle itself performs the additional function. It goes without saying, however, that further components can be provided in addition in conjunction with the respective function.

The holder part can also have integrated cable and/or hose fasteners. In the case of a frame part, this cannot be realized or can be realized only with great outlay, whereas corresponding shaping in the case of a plastic part is possible without problems.

According to a further aspect of the invention, the holder part has shock-absorbing properties. Unlike a frame part, the holder part made from plastic can be designed in such a way that, in the case of an impact, it provides a crumple zone, in order to dampen the impact by way of energy conversion.

Fastening devices can advantageously be saved by the holder part having at least one integrated fastening section for fastening a further vehicle component.

A further additional function which can be performed by the holder part according to the invention is the protection of a further vehicle component. To this end, a protective section which is integrated into the holder part is provided.

On account of the greater degree of design freedom in comparison with metal frame parts, it is possible without great additional outlay to realize the abovementioned functions by way of corresponding shaping in the plastic holder part.

According to one preferred embodiment of the invention, the holder part has a V-shaped holder which is preferably configured as a hollow profile and has an end section which is divided by way of a longitudinal cutout and is penetrated by a transverse opening. A plate-like fastening section of the muffler protrudes with a hole into the longitudinal cutout, which fastening section is fastened to the holder by way of a fastener, in particular by way of a screw and a nut. A bush is preferably inserted into the hole of the fastening section, into which bush a rubber grommet with a spacer piece received therein is in turn inserted.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
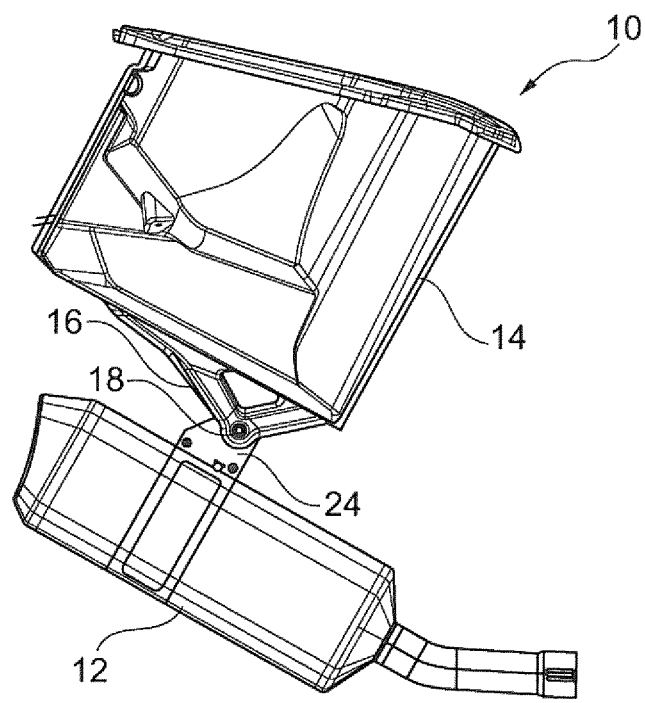
FIG. 1 is a side view of a device according to an embodiment of the invention for holding a muffler.

FIG. 1 shows a device 10 for holding a muffler 12 of a motorcycle. The device 10 includes a holder part 14 of the motorcycle, in the form of a helmet compartment here, made from plastic. The holder part 14 is connected to the muffler 12. The holder part 14 itself is, in turn, connected fixedly to a structural component (not shown) of the motorcycle, such as a frame part.

Figure 2:
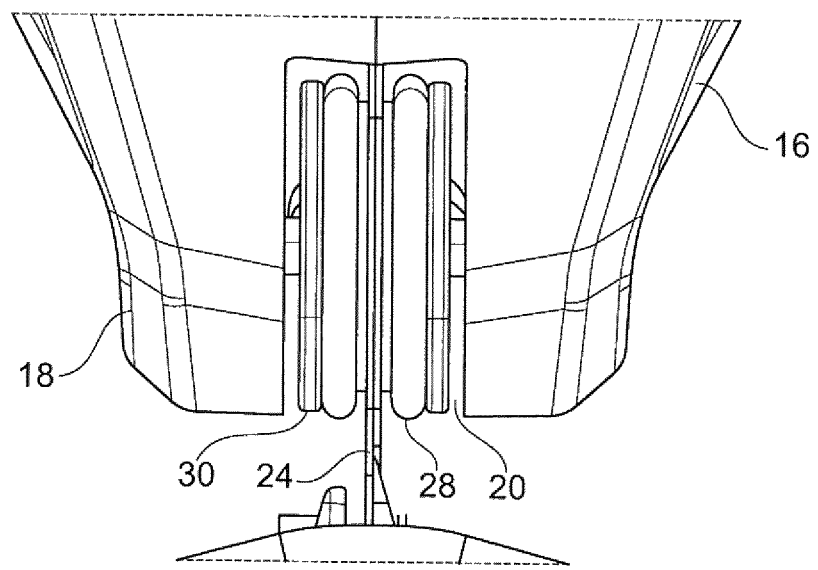
FIG. 2 is a front view of the device from FIG. 1 in detail.
Figure 3:
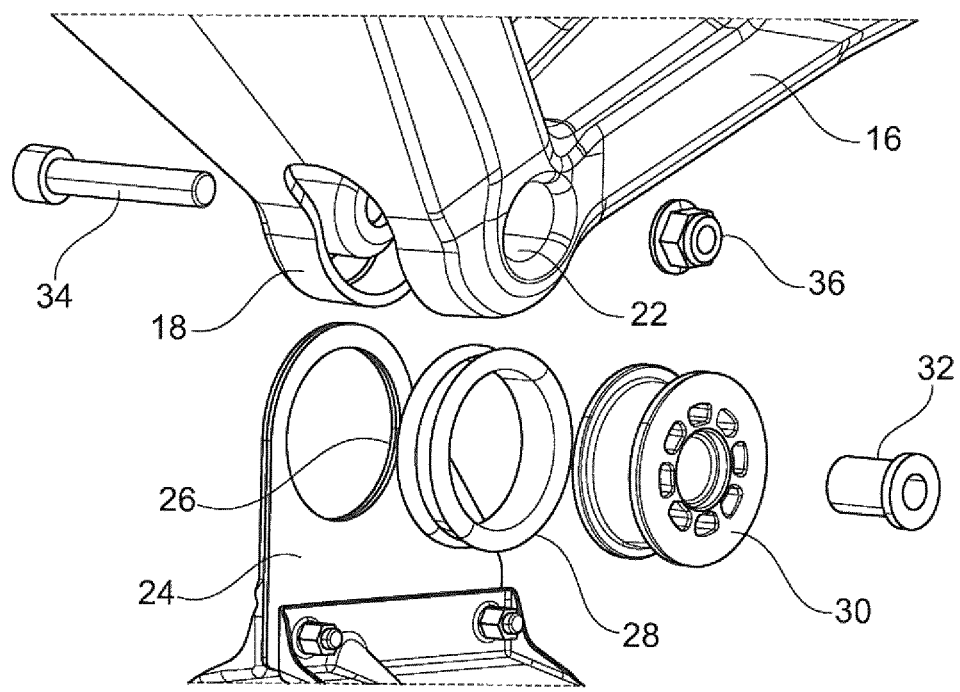
FIG. 3 is an exploded view of a portion of the device from FIG. 2.

The connection of the muffler 12 to the holder part 14 and the parts which are used according to the exemplary embodiment which is shown can be seen in detail in FIGS. 2 and 3. The holder part 14 has a protruding, V-shaped holder 16 which is configured as a hollow profile and is divided at its exposed end section 18 by way of a longitudinal cutout 20. The end section 18 is penetrated by a transverse opening 22.

A plate-like fastening section 24 of the muffler 12 protrudes into the longitudinal cutout 20 of the holder 16, which fastening section 24 can be configured in one piece with the muffler 12 or as a separate component which is connected to the latter. The fastening section 24 has a hole 26, into which a bush 28 made from an elastic material is inserted. A rubber grommet 30 with a spacer piece 32 received therein is in turn inserted into the bush 28. The rubber grommet 30 serves as a decoupling element, in order to suppress the transmission of mechanical vibrations between the muffler 12 and the holder part 14. Moreover, the rubber grommet 30 can be configured as a length compensating grommet (not shown).

The connection between the muffler 12 and the holder 16 of the holder part 14 is fixed by way of a nut 36 and a bolt 34 which is introduced into the transverse opening 22 and penetrates the rubber grommet 30 and the spacer piece 32.

The device according to the invention for holding a muffler has been illustrated and explained in specific terms using the example of a helmet compartment. However, the holder part 14 can also be a different, robust plastic part which can be connected to a structural component of a two-wheeled vehicle. Moreover, the holder part 14 can perform further functions; for example, it can have integrated air guides, integrated cable and/or hose fastenings, an integrated fastening section for fastening a further vehicle component and/or an integrated protective section for protecting a further vehicle component. As a plastic component, in addition, the holder part 14 can be designed as a shock-absorbing element.

LIST OF DESIGNATIONS

10 Device
12 Muffler
14 Holder part
16 Holder
18 End section
20 Longitudinal cutout
22 Transverse opening
24 Fastening section
26 Hole
28 Bush
30 Rubber grommet
32 Spacer piece
34 Bolt
36 Nut The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for holding a muffler of a two-wheeled vehicle, comprising:
    a holder part configured to be fastened to a structural component of the two-wheeled vehicle and further configured to hold the muffler of the two-wheeled vehicle, the holder part having a V-shaped holder configured as a hollow profile with an end section divided by way of a longitudinal cut out configured to receive a plate-shaped fastening section of a muffler, the end section being penetrated by a transverse opening configured to receive a fastener to secure the muffler fastening section to the holder part,
    wherein the holder part is a plastic part configured to perform an additional function in addition to holding of the muffler of the two-wheeled vehicle, the additional function including one or more of
        receiving user-deposited objects,
        altering air flow passing the holder part,
        supporting a cable, a hose, or a cable and a hose adjacent to the holder part,
        supporting a vehicle component fastened to the holder part, and
        protecting another vehicle component.

2. The device according to claim 1, wherein the holder part is configured to be fastened to a frame construction of the two-wheeled vehicle.

3. The device according to claim 1, wherein the holder part is configured as a helmet compartment.

4. The device according to claim 3, wherein the holder part has integrated air guides.

5. The device according to claim 4, wherein the holder part has integrated cable and/or hose fasteners.

6. The device according to claim 5, wherein the holder part is configured to have shock-absorbing properties.

7. The device according to claim 6, wherein the holder part has at least one integrated fastening section configured to fasten a further vehicle component.

8. The device according to claim 7, wherein the holder part has an integrated protective section configured to protect a further vehicle component.

9. The device according to claim 1, wherein the holder part has integrated air guides.

10. The device according to claim 1, wherein the holder part has integrated cable and/or hose fasteners.

11. The device according to claim 1, wherein the holder part is configured to have shock-absorbing properties.

12. The device according to claim 1, wherein the holder part has at least one integrated fastening section configured to fasten a further vehicle component.

13. The device according to claim 1, wherein the holder part has an integrated protective section configured to protect a further vehicle component.

14. The device according to claim 1, wherein the two-wheel vehicle is a motorcycle.

15. A two-wheeled vehicle having a structural component, the two-wheeled vehicle comprising:
    a muffler;
    a holder part configured to be fastened to the structural component of the two-wheeled vehicle and being configured to hold the muffler, the holder part being a plastic part, wherein
    the holder part has a V-shaped holder configured as a hollow profile with an end section divided by way of a longitudinal cut out, the end section being penetrated by a transverse opening, the muffler has a plate-shaped fastening section with a hole therein, the fastening section being arranged in the longitudinal cut out of the V-shaped holder, and a fastener is configured to fasten the fastening section of the muffler to the V-shaped holder of the holder part.

16. The two-wheeled vehicle according to claim 15, wherein:

the fastener comprises a bolt and nut, a bush is inserted into the hole of the fastening section, into which bush a rubber grommet having a spacer piece received therein is inserted into the bush, and the bolt penetrates the transverse opening and the bush to secure the muffler to the holder part with the nut.

17. The two-wheeled vehicle according to claim 16, wherein the two-wheeled vehicle is a motorcycle.

18. The two-wheeled vehicle according to claim 17, wherein the structural component of the motorcycle is a portion of a frame of the motorcycle.

19. The two-wheeled vehicle according to claim 18, wherein the holder part is further configured as a helmet compartment for the motorcycle.

\* \* \* \* \*